(12) United States Patent
Cohen et al.

(10) Patent No.: US 11,136,189 B2
(45) Date of Patent: Oct. 5, 2021

(54) ROBOTIC DELIVERY AND RETRIEVAL OF CRATES TO AND FROM NON-UNIFORMLY SIZED STORAGE SPACES IN A VERSATILE SHELVING ARRAY

(71) Applicant: Commonsense Robotics, Ltd., Tel Aviv (IL)

(72) Inventors: Shay Cohen, Shoham (IL); Guy Blotnik, Tel Aviv (IL)

(73) Assignee: GET FABRIC LTD, Tel Aviv (IL)

( * ) Notice: Subject to any disclaimer, the term of this patent is extended or adjusted under 35 U.S.C. 154(b) by 241 days.

(21) Appl. No.: 16/479,680

(22) PCT Filed: Feb. 21, 2018

(86) PCT No.: PCT/IL2018/050199
§ 371 (c)(1),
(2) Date: Jul. 22, 2019

(87) PCT Pub. No.: WO2018/154573
PCT Pub. Date: Aug. 30, 2018

(65) Prior Publication Data
US 2021/0009349 A1 Jan. 14, 2021

Related U.S. Application Data

(60) Provisional application No. 62/461,243, filed on Feb. 21, 2017.

(51) Int. Cl.
*B65G 1/04* (2006.01)
*B65G 1/06* (2006.01)
(Continued)

(52) U.S. Cl.
CPC ............ *B65G 1/0414* (2013.01); *B61B 13/00* (2013.01); *B61F 99/00* (2013.01); *B65G 1/0492* (2013.01);
(Continued)

(58) Field of Classification Search
CPC ..... B65G 1/0492; B65G 1/065; B65G 1/0414
See application file for complete search history.

(56) References Cited

U.S. PATENT DOCUMENTS

| 10,919,701 B2* | 2/2021 | Lert, Jr. ............... B65G 1/0492 |
| 2010/0322747 A1* | 12/2010 | Lert ..................... B65G 1/1371 414/273 |
| 2011/0176895 A1 | 6/2011 | Kortelainen |

(Continued)

OTHER PUBLICATIONS

PCT/ISR/210 Search Report dated Aug. 30, 2018 (pp. 9).

*Primary Examiner* — Thomas Randazzo
(74) *Attorney, Agent, or Firm* — Tutunjian & Bitetto, P.C.

(57) ABSTRACT

A storage setup and method for robotic delivery and retrieval of crates from shelving blocks are disclosed. At least one shelving block in the setup comprises non-uniformly spaced apart storage surfaces. The storage surfaces are accessible to lift-robots through a network of tracks comprising intersecting vertically and horizontally oriented tracks. A computerized control system is configured to differentiate between storage locations based on which crate sizes from at least two different ranges of crate sizes a storage location can store. The storage may be automatically optimized by routing robots to store crates in storage locations sized in correlation with the size of the crate to be stored.

23 Claims, 2 Drawing Sheets

(51) Int. Cl.
- *B61B 13/00* (2006.01)
- *B66F 9/06* (2006.01)
- *G05B 19/4155* (2006.01)
- *B61F 99/00* (2006.01)
- *B61C 13/00* (2006.01)

(52) U.S. Cl.
CPC .............. *B65G 1/065* (2013.01); *B66F 9/063* (2013.01); *G05B 19/4155* (2013.01); *B61C 13/00* (2013.01); *B65G 2203/0208* (2013.01); *G05B 2219/50362* (2013.01)

(56) References Cited

U.S. PATENT DOCUMENTS

| | | | |
|---|---|---|---|
| 2012/0029687 A1 | 2/2012 | Hagen et al. | |
| 2013/0129453 A1* | 5/2013 | Salichs | B65G 1/065 414/277 |
| 2014/0003894 A1* | 1/2014 | Takahara | B66F 9/08 414/277 |
| 2014/0288696 A1* | 9/2014 | Lert | B65G 1/0492 700/216 |
| 2014/0343713 A1* | 11/2014 | Ziegler | B65G 1/137 700/214 |
| 2015/0225187 A1* | 8/2015 | Razumov | B65G 1/065 414/279 |
| 2016/0122135 A1* | 5/2016 | Bastian, II | B65G 1/0492 198/347.1 |
| 2016/0167880 A1* | 6/2016 | Pankratov | B65G 1/1378 414/281 |
| 2016/0304280 A1 | 10/2016 | Elazary et al. | |
| 2016/0355339 A1 | 12/2016 | Peng | |
| 2017/0029212 A1* | 2/2017 | Huiskamp | B65G 1/0492 |
| 2017/0129704 A1* | 5/2017 | Okazaki | B65G 1/06 |
| 2017/0267452 A1* | 9/2017 | Goren | B65G 1/137 |
| 2018/0305122 A1* | 10/2018 | Moulin | B65G 1/1378 |

* cited by examiner

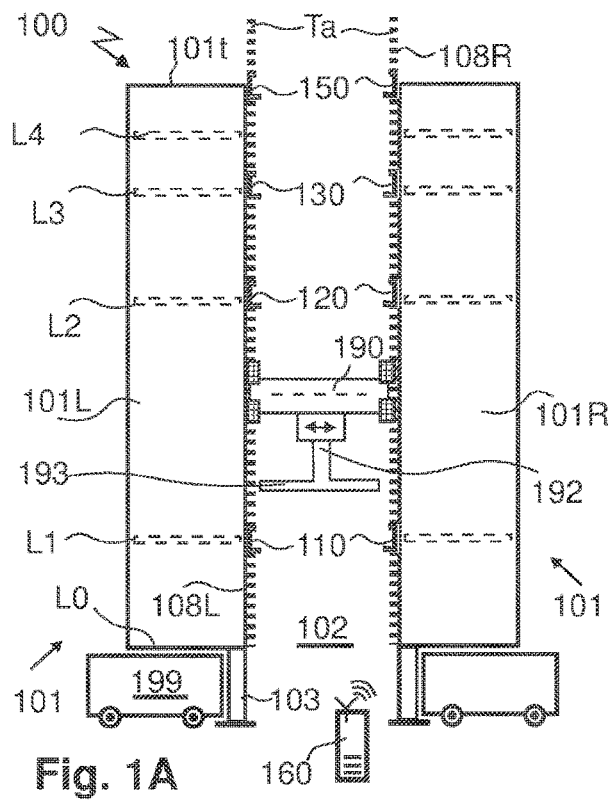
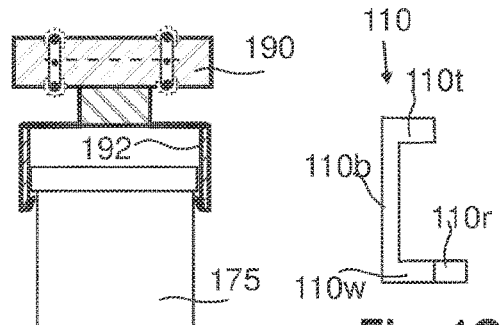
Fig. 1B
Fig. 1C
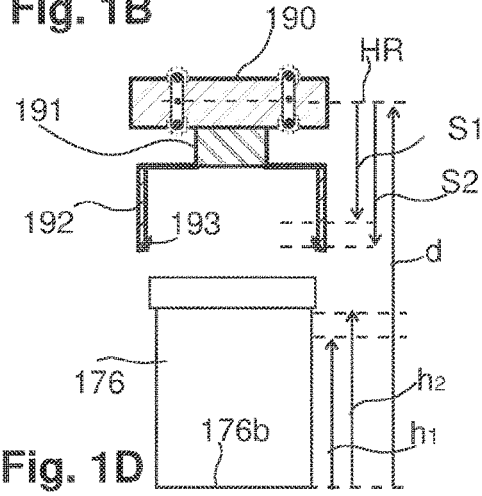
Fig. 1D
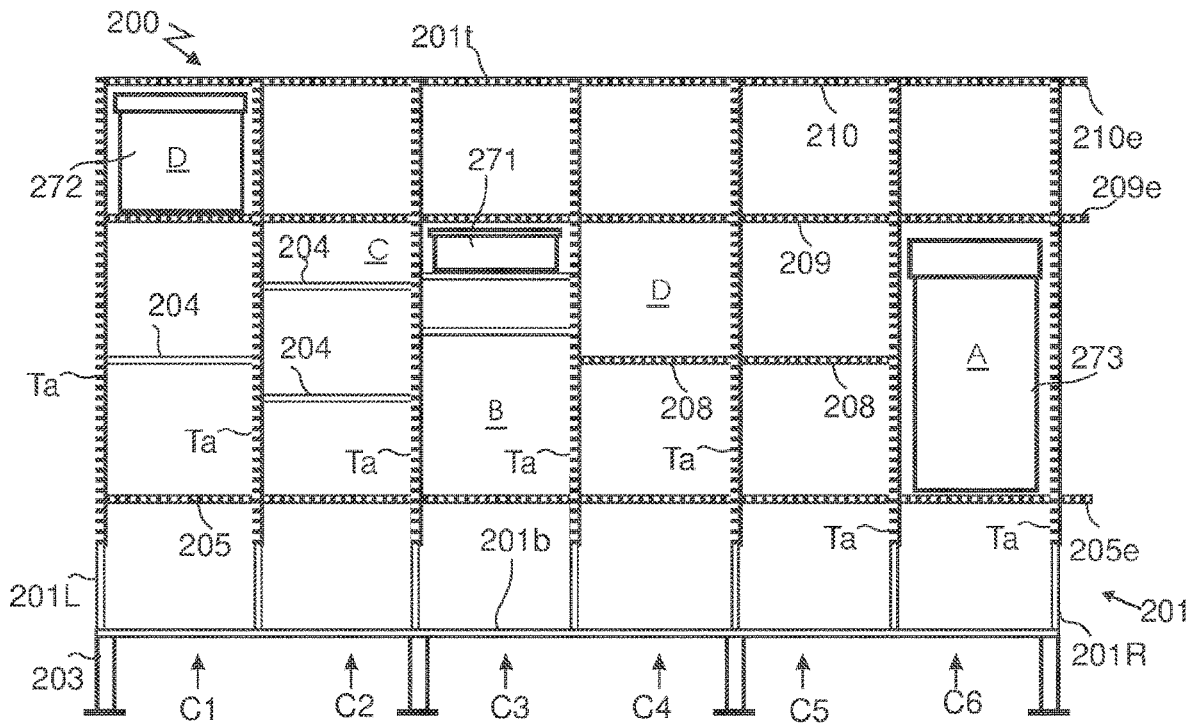
Fig. 2A

ROBOTIC DELIVERY AND RETRIEVAL OF CRATES TO AND FROM NON-UNIFORMLY SIZED STORAGE SPACES IN A VERSATILE SHELVING ARRAY

CROSS-REFERENCE TO RELATED APPLICATION

This application claims the benefit of U.S. Provisional Application No. 62/461,243 filed Feb. 21, 2017, entitled "LIFT ROBOT CONFIGURATIONS", which is hereby incorporated by reference in its entirety without giving rise to disavowment.

TECHNICAL FIELD

The present disclosure generally relates to the field of shelving infrastructures for fully-automated or semi-automated distribution and retrieval of crates in logistic distribution centers.

BACKGROUND

Modern logistic centers often make use of conveyors and/or robots in the fully-automated or semi-automated processes of distribution of crates to their designated locations in a shelving array, as well as of returning stored crates upon demand.

Much care is given to the performances of robots, and efforts are made to improve the efficiency of a logistic centers by improving the performance of robots based on cutting edge technologies.

It is therefore among the object of the disclosed subject matter to optimize the performances of logistic centers from the point of view of the storage facilities with which the robots interact.

Another object of the disclosed subject matter is to improve the performances of robots and of robotic interactions, based on the improvements to the storage facilities.

Other objects of the disclosed subject matter will become more apparent throughout the specification that follows.

BRIEF SUMMARY

A first broad aspect the presently disclosed subject matter is a storage setup for logistic centers using lift robots for storing and retrieving crates.

In one exemplary embodiment of said first broad aspect, the storage setup comprises: (i) at least one shelving block comprising at least one shelving unit, wherein each shelving unit having a plurality of horizontally oriented vertically spaced apart storage surfaces configured to store thereon crates of a size within a predetermined depth width and height range of sizes; (ii) a network of intersecting track arrays deployed next to the block's shelving for allowing robotic delivery and retrieval of crates to and from storage locations in the shelving block; and (iii) a computerized control system in which storage locations and track data are registered such that robots can be routed by the computerized control system through the tracks for delivering crates to and retrieving crates from the storage locations; wherein at least two groups of storage locations in at least one shelving block differ in the size of the vertical spacing between horizontally oriented storage surfaces such that crates of a height shorter than the size of the vertical spacing in at least one of the groups but taller than the size of the vertical spacing in other of the groups can be robotically stored to and retrieved from a horizontally oriented storage surface constituting a storage location in which the vertical spacing is of a size greater than a height of the crate; wherein the computerized control system is configured to differentiate between storage locations based on which crate sizes from at least two different ranges of crate sizes a storage location is capable of storing.

In various embodiments of the presently disclosed subject matter, the computerized control system is further configured to route robots to store crates in storage locations based on detecting the correlation between the range of crate sizes to which each crate is related and between the vertical spacing associated with an intended storage location.

In various embodiments of the presently disclosed subject matter, the computerized control system is configured to route robots to store crates in storage locations sized in correlation with the size of the crate to be stored, wherein crates intended for storage are routed for storage in a smallest available storage location capable of storing an intended crate.

In various embodiments of the presently disclosed subject matter, the computerized control system is configured to route robots for relocating crates from storage locations of a first height to storage locations having a height smaller from the first and larger than a height of a relocation intended crate, whenever criteria are met.

In various embodiments of the presently disclosed subject matter, the criteria include a storage location of a height smaller than the first and larger than a height of a relocation intended crate becomes available.

In various embodiments of the presently disclosed subject matter, the criteria include there is a shortage in storage locations of a height similar to a height of a storage location where a carte that can be stored in a storage location of a smaller height can be stored.

In various embodiments of the presently disclosed subject matter at least one pair of vertically oriented tracks is positioned next to the shelving unit in front of at least one of the groups of storage locations which differ in size of the vertical spacing between horizontally oriented storage surfaces.

In various embodiments of the presently disclosed subject matter the array of vertically oriented tracks comprises uniformly spaced apart vertical tracks installed next to the shelving unit all along the lateral extent of the shelving block.

In various embodiments of the presently disclosed subject matter at least a predetermined number of tracks from the array of horizontal tracks are positioned next to front edges of horizontally oriented storage surfaces included in the regions which differ in spacing in the vertical direction between horizontally oriented storage surfaces.

In various embodiments of the presently disclosed subject matter the array of horizontal tracks includes a plurality of horizontally oriented track segments non-uniformly spaced apart in the vertical direction.

In various embodiments of the presently disclosed subject matter at least some of the tracks segments which are non-uniformly spaced apart in the vertical direction, are deployed substantially next to front edges of respective horizontally oriented storage surfaces.

In various embodiments of the presently disclosed subject matter free ends of vertical rails included in the array of vertically oriented tracks extend a predetermined extent from above a topmost horizontally oriented storage surface.

In various embodiments of the presently disclosed subject matter free ends of horizontal rails included in the array of horizontally oriented tracks extend a predetermined extent beyond a lateral end of the shelving block.

In various embodiments of the presently disclosed subject matter at least a lowermost horizontal track extends evenly all along the lateral extent of the shelving block.

In various embodiments of the presently disclosed subject matter a predetermined number of horizontal surfaces located in a first region of the shelving block are vertically spaced apart each from a neighboring surface a distance between 10% and 90% smaller than a distance between horizontal neighboring surfaces of another predetermined number of surfaces located at a different region of the shelving block.

In various embodiments of the presently disclosed subject matter a topmost and a lowermost horizonal tracks intersect with a pair of leftmost vertical tracks and with a pair of rightmost vertical tracks, thereby forming a closed-loop track arrangement through which a plurality of between two and a predetermined maximal number of robots can comove either clockwise or counter clockwise such that none of the comoving robots disturbs the motion of another.

In various embodiments of the presently disclosed subject matter at least in regions of the shelving block where a vertical spacing between neighboring horizontal storage surfaces exceeds a predetermined threshold value, the shelving block comprises a plurality of uniformly spaced apart vertical tracks installed next to front edges of the horizontal storage surfaces constituting said regions.

In various embodiments of the presently disclosed subject matter the predetermined threshold value is equal to the sum of (i) a height between a bottom of a maximal height crate to be stored in the shelving block and a topmost portion of such crate where grasping arms of a lift-robot loading-unit can take a grasp and load the crate; and (ii) a maximal vertical separation between a hypothetic horizontal track and the grasping arms of said lift-robot loading-unit, when the lift robot is situated in the hypothetic horizontal track.

A second broad aspect the presently disclosed subject matter is a computerized control system for robotic delivery and retrieval of crates in a logistic center setup according to said first broad aspect.

In one exemplary embodiment the system is configured to register storage locations and track data and to route robots through the tracks for delivering crates to and retrieving crates from the storage locations, wherein the registration of storage locations includes differentiation between at least two groups of storage locations differing in the vertical distance between horizontally oriented storage surfaces in each group.

In various embodiments of the presently disclosed subject matter the system is further configured to relocate crates for storage optimization.

In various embodiments of the presently disclosed subject matter the system is further configured to route lift robots having lading-unit atop and lift robots having suspended loading unit to a meeting point on the track network for exchanging a crate.

A third broad aspect of the presently disclosed subject matter is a method for robotic delivery and retrieval of crates to and from non-uniformly sized storage spaces in a shelving array wherein the storage spaces are accessible to lift robots through intersecting arrays of vertically oriented and horizontally oriented tracks.

In one exemplary embodiment method comprises: (i) having a minimum and a maximum of a vertical extent between a horizontal track and loading-unit grippers of a lift-robot supposedly situated in the horizontal track; (ii) having a minimum and a maximum height between a bottom of a crate to be handled by the lift robot and a desired griping region within which the crate walls are to be contacted by said grippers when grasping the crate; (iii) determining a location on a horizontal storage surface in a shelving unit, to which the crate is to be delivered or from which retrieved by the lift robot; calculating a desired range of heights with respect to the horizontal surface at which the lift-robot can be situated when handling the crate to or from the location; (iv) determining the availability of horizontal tracks and of vertical tracks in which the lift robot may be situated for aligning its grippers in front of the location within said range of heights; (v) selecting a specific lift robot for handling the crate to or from the location; (vi) routing the lift robot through said arrays of intersecting tracks to within the desired range of heights with respect to the location and situating the lift robot in alignment with the location; and (vii) activating said arms for handling the crate to or from the location.

In various embodiments of the presently disclosed subject matter the desired range of heights for delivering a crate to the location differs from the desired range of heights for retrieving the same crate from the location.

In various embodiments of the presently disclosed subject matter the method is further comprising the step of determining what type robot is suitable for the delivery or retrieval of the crate; and performing the method respect to at least two suitable robot types before the step of selecting a specific robot for the delivery or retrieval of the crate.

BRIEF DESCRIPTION OF THE FIGURES

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1A illustrates a schematic side view of a shelving block comprising two facing shelving units according to an embodiment of the presently disclosed subject matter with a lift robot situated on tracks in between.

FIG. 1B illustrates a schematic front view of the lift robot shown in FIG. 1A, with a crate grasped between the grippers of its suspended loading-unit.

FIG. 1C illustrate a schematic profile view of a rail type that may be used for constructing track arrays according to various embodiments of the presently disclosed subject matter.

FIG. 1D outlines how some distances referred in the description are to be measured.

FIG. 2A illustrates a schematic front view of a shelving unit with intersecting track arrays according to an embodiment of the presently disclosed subject matter.

DETAILED DESCRIPTION

Figure 2B:
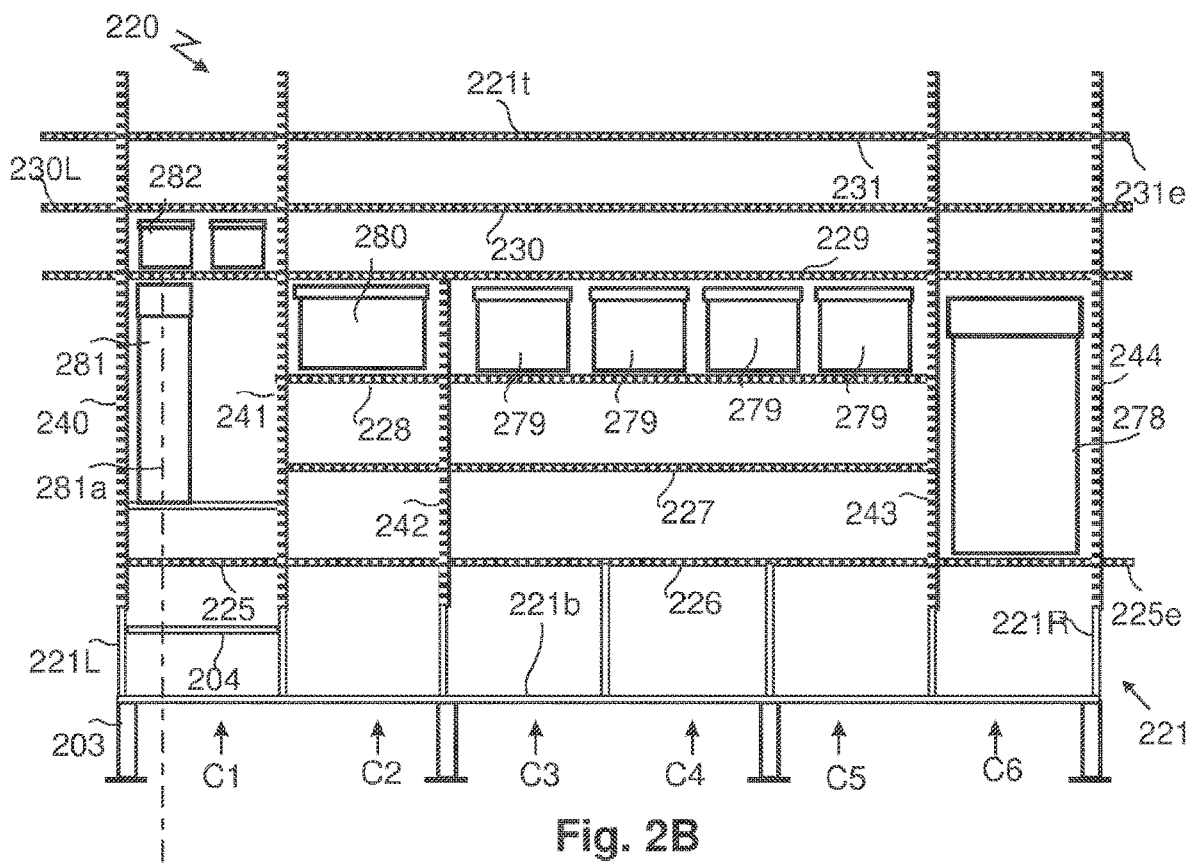
FIG. 2B illustrate a schematic front view of a shelving unit with intersecting track arrays according to another embodiment of the presently disclosed subject matter.

In modern logistic centers having automated crate delivery and retrieval system, there is a need in lift mechanisms for reaching vertically spaced apart storage surfaces, located beyond the reach of surface bogies moving on the floor.

In various embodiments of the presently disclosed subject matter, the logistic center uses self-propelled lifters which can change their direction of motion through passive track array independently of external mechanisms. In other various embodiments, the track array includes guides in track junctions for steering the robot through the junction in the desired direction. In some cases, the robot may be configured to actuate the guides in an autonomous manner. Additionally or alternatively, the guides may be actuated by track-mounted actuators external to the robot.

Track array for self-propelled lifters (hereinafter referred to "lift-robots") may comprise vertically oriented tracks. Vertical tracks provide for vertical motion of robots, e.g. based on rack and pinion driving mechanism.

In the context of the present disclosure, the term "crate" relates to a container, a box, a tote, or a similar object capable of containing items stored in the shelving unit.

In the context of the present disclosure, the term "track" relates to a pair of parallel rails with a predetermined gap in between. In various embodiments of the presently disclosed subject matter, two parallel tracks (comprising four rails in total) are located next to any storage location intended to be accessed by lift robots through motion in the vertical direction. The gap between the two tracks matches the distance between the rail wheels of the lift robot in a vertical plane parallel to the shelving block.

Locomotion through tracks is restrictive in that tracks must have a width perpendicular to the direction of motion in match with the distance between the rail wheels of lift-robot bogies, which in turn places restriction on the maximal width of crates that can be handled.

This restriction reflects on the efficiency of a logistic center in terms of the three-dimensional space spent per a given volume of stored stuff. Robots are restricted to a motion about tracks, the width of tracks is constant, crates are accessible to lift robots moving in the vertical direction through the constant gap between pairs of neighboring tracks, resulting in that crates have a maximal width smaller than the gap between neighboring tracks. The problem is that in case storage locations are approached by lift-robots moving in the vertical direction, the maximal crate width is adopted also as the standard width (i.e. crates of only one uniform size are used), because the lateral distance between on storage location to a next storage location is equal to the gap between neighboring tracks, regardless of the width of the stored crates.

Another restriction that may reflect on the efficiency of a logistic center in terms of the three-dimensional space spent per a given volume of stored stuff, results from the specifications of robotic arms by which crates are loaded and carried (such as their range of motion). As an example, a robot may include a locomotion unit with rail wheels in the form of pinions for coupling to a track, and a loading-unit which may comprise robotic arms for handling crates to and from a storage position. In some robot designs, the loading-unit is located underneath the locomotion unit. A position of the grasping members of the robotic arms may thus be a predetermined distance below the location of the rail wheels, and the predetermined range of operation of the loading-unit arms may therefore be restricted to a predetermine storage space below a given location of a horizontal track.

As an example, when a storage spot is way below a closest horizontal track, a top of a crate stored at that spot may be out the reach of the loading-unit arms of the lift-robot. Substantial uniformity in a height of crates may therefor be required, otherwise certain storage locations may become inaccessible to a lift-robot using a horizontal track.

It may be of interest to allow for compactization of storage spaces in logistic centers for thereby improving the volume-efficiency of the logistic center (i.e. store more items per a unit of storage volume).

It may also be of interest to allow the compactization with minimal loss of accessibility efficiency.

A first solution according to the presently disclosed subject matter is to provide for nonuniform vertical spacing between horizontal storage surfaces with the intention to improve correlation between the dimensions of stored items and the dimensions of their storage cells, and to adopt the usage of crates of varied sizes, with the intension to optimize correlation between the size of crates and the size of the items contained by.

Another solution is to trace the distribution of crate-sizes flowing through the logistic center over a representing time period, and to adapt the distribution of sizes of storage location to the distribution of crate sizes, thereby increasing the practical storage capacity of the logistic center.

Yet another solution is to relocate stored items in real-time from large storage location to smaller storage locations, when smaller storage locations become available.

A solution for storage spaces intended to contain no more than one crate per a width of lift-robots to be used, is to provide the shelving block with a pair of vertical track rails next to the non-uniformly vertically spaced surfaces. In some cases, a distance between such neighboring track rails corresponds to the respective wheelbase dimension of the lift-robots. The gap between the two tracks may match the distance between the rail wheels of the lift robot in a vertical plane parallel to the shelving block.

In the context of the presently disclosed subject matter, tracks extend perpendicularly to a vertical surface next to front edges of horizontally oriented storage surfaces (shelves) and are often shared by two facing shelving units (being constituents of one shelving block), spaced by an aisle of the tracks' width, with the tracks spanning across the aisle. Accordingly, each rail in said pair of vertical track rails next to the non-uniformly vertically spaced surfaces, forms a track with the other rail in the pair as well as with a mirroring rail located from the opposite side of the aisle.

In various embodiments of the presently disclosed subject matter, a plurality of uniformly spaced apart vertical tracks are positioned next to front edges of the non-uniformly spaced storage surfaces. The tracks may create columns of equal predetermined width through which the storage spaces between said non-uniformly spaced surfaces become accessible to lift robots. The predetermined distances between the rails constituting the tracks are in match with a width of the robots, measured as respective distances between rail wheels of the lift robots to be using the tracks, thereby allowing a lift robot to adapt the location of its loading-unit in front of any storage location opened to the column between a pair of neighboring track rails, regardless of the vertical spacing between horizontal surfaces delimiting the storage location concerned.

When employing such architecture, crates may have a uniform width, but not necessarily a uniform height. This provides a versatility in the sizes of crate, without altering the mechanical requirements with which lift robots should comply.

As an example of the versatility achieved, a most common size may be agreed upon as a "standard size" crate, yet any other height may be used, either as a given fraction of the standard, as an integer multiplication thereof, or freely chosen.

In various embodiments of the presently disclosed subject matter, at least some of the vertical tracks deployed about a shelving unit extend upwardly beyond a bottom of the upper storage space opened to between rails thereof, to an extent sufficient to allow a lift robot positioning its loading-unit arms for conveniently handling a delivery or retrieval of crate located on a storage surface constituting said bottom. Accordingly, in various embodiments of the presently disclosed subject matter vertical tracks extend from above a top of a shelving system, thereby allowing to use a topmost storage surface for crates of smallest expected height, with a minimal vertical spacing between the shelving top and the topmost storage surface, thereby leaving more storage space for storage surfaces below the topmost.

In various embodiments of the presently disclosed subject matter, the top of vertical tracks in the shelving block intersect a bottom horizontal rack of a topmost horizontal rail thereby providing a T junction between each vertical track rail and the horizontal rail, while a top horizontal ledge of the horizontal rail remains intact.

In various embodiments of the presently disclosed subject matter, vertical tracks in the storage array intersect a topmost horizontal rail of the storage array, thereby providing a cross junction between each vertical track rail and the horizontal rail. In some embodiments, a free end of vertical rails constituting the vertical tracks of a shelving block of the presently disclosed subject matter, is blocked to prevent escape of lift robot roadwheel. In some embodiments the blocking is by a bolt secured through holes near the free end of the rail.

In various embodiments according to the presently disclosed subject matter, a horizontal track is deployed as part of the shelving block next to a front edge of each horizontal storage surface of a plurality of horizontal storage surfaces, regardless of the vertical spacing between a concerned storage surface and storage surfaces next to it in the vertical direction, whenever there is a vertical track present near the end of the horizontal surface such that the horizontal track may provide for a junction with the vertical track. Some of the horizontal rails may thus be unevenly spaced apart in the vertical direction.

In various embodiments of the presently disclosed subject matter, at least some of the horizontal tracks deployed as a part of a storage array, extend laterally beyond the end of the horizontal storage surfaces. In various embodiments, the extent to which horizontal tracks extend laterally beyond the end of the horizontal storage surfaces is in match with the maximal extent to which lift robots in use need to shift laterally for alignment between a loading-unit of the robot and a center of a crate of minimal expected width when stored near said end of a horizontal storage surface, thereby minimizing the storage space to be occupied by such crates. In various embodiments, the extent to which horizontal tracks extend laterally beyond the end of the horizontal storage surfaces is in match with the minimal extent to which lift robots in use need to shift laterally for temporarily evacuating a track spot through which another robot or robots intend to travel.

In various embodiments of the presently disclosed subject matter a lane empty of horizontal storage surfaces separates between shelving blocks located from opposite sides of the lane. The shelving blocks are extending perpendicularly to the lane, with aisles separating between shelving units from a same side of the lane opened to the lane. In some embodiments of the presently disclosed subject matter, horizontal tracks extend laterally beyond the end of the horizontal storage surfaces of a shelving block from one side of the lane, merge with respective horizontal tracks of a shelving block located from the opposite side of the lane, thereby allowing lift robots to either (i) travel across the lane for making routine deliveries and retrieval of crates; (ii) shift laterally for alignment between a loading-unit of the robot and a center of a crate of minimal expected width when stored near the end of a horizontal storage surface next to the lane; (iii) shift laterally for temporarily evacuating a track spot through which another robot or robots intend to travel.

In some embodiments of the presently disclosed subject matter, at least some of the extent to which a track extends beyond the ends of the storage surfaces is utilized as a charging station. A portion of the extra track extent beyond the end of the storage surfaces is provided with a pair of conductive strips, one strip per each of the two rails constituting the track, is connected to a respective pole of electrical battery charger, the strips are electrically isolated from the rails, thereby allowing robots having electrical collectors for charging, to be recharged while stationary situated on the extra portions of the tracks, and without interfering the system's transportation activity through connective track portions.

The above described solutions and features will be further explained in more detail with reference to the figures.

FIG. 1A illustrates a schematic side view of a storage setup 100 according to an exemplary embodiment of the presently disclosed subject matter. The storage setup comprises two facing shelving units 101 (due to the side view, only the vertical side wall 101L of the left one and the vertical side wall 101R of the right one are shown), a central computer 160 in wireless communication with robots 190 and 199, and a pair of intersecting track arrays. The intersecting track arrays include horizontally oriented tracks 110, 120, 130 and 150, and vertically oriented tracks Ta. Each track Ta comprises one rail 108R located adjacently to the right storage array 101R, and another rail 108L located adjacently to the left storage array 101L. In the schematic of the present disclosure, rails of vertical tracks are represented by comb-like patterned lines when illustrated from their face or side views. When illustrated from their free-end view, rails of both horizontal and vertical tracks are represented by the shape illustrated in FIG. 1C (reduced in size according to image scale).

In various embodiments of the presently disclosed subject matter, all or some of the horizontally oriented tracks are positioned, respectively, next to front edges of the horizontal storage surfaces of the storage array.

In various embodiments of the presently disclosed subject matter, some or all of the horizontally oriented tracks are positioned, respectively, each adjacently to a front edge of a respective horizontal top or bottom plate of the shelving unit.

A lift robot 190 is situated on the vertical tracks Ta which extend transversely to the passage 102 (referred to also as "aisle") which separates between the facing shelving units. The lift robot 190 can climb and descend along the tracks Ta in the vertical direction. In various embodiments of the disclosed subject matter, the lift robot 190 can travel also laterally along the horizontal tracks. In various embodiments of the disclosed subject matter, lift robots are capable of switching their motion mode from vertical to horizontal and vice versa, in intersections between the vertical and horizontal tracks.

The lift robot 190 comprises a loading unit 191 that can slide its arms 192 and/or grippers 193 to the left and to the right for accessing into the storage spaces and deliver or retrieve crates to/from the horizontal storage surfaces of either of the facing shelving units. A plurality of lift robots may perform simultaneously on the track arrays between a pair of facing shelving units. In various embodiments of the presently disclosed subject matter, lift robots cooperate with floor robots 199 in the delivery and retrieval of crates. The floor robots 199 may travel through the aisle 102, stop below a lift robot 190 for letting the lift robot 190 to pick a crate for storage, or receive a retrieved crate from a lift robot 190 for delivering it to another location in the logistic center, e.g. a picking station.

In various embodiments of the presently disclosed subject matter, bottom storage surface of a shelving unit may be gapped a predetermined distance above the floor. The shelving unit may include support legs 103. The height of support legs 103 can predetermine the distance of the bottom storage surface L0 from above the floor. In various embodiments of the presently disclosed subject matter, when empty from crates, floor robots 199 may travel through the gap between bottom storage surface L0 and the floor. Additionally or alternatively, the height of support legs 103 may be designed to allow floor robots 199 to travel through the gap, when crates are loaded thereon, such as crates of a maximal height. As an example, the maximal height may be the standard height of the crates, may be a median height of the crates in the shelving block or based on other common characteristics of the crates in the shelving block, or the like.

Each of the shelving units comprises a plurality of horizontal storage surfaces L0 to L4 nonuniformly spaced in the vertical direction. For example, the distance between the bottom storage surface L0 and the storage surface L1 neighboring from above is closely the same as the distance between storage surface L2 and the storage surface L3, yet both differ from the distances between the other pairs of neighboring surfaces.

The distribution in the heights of the storage surfaces allows to store in the shelving block crates of a variety of heights, and to locate each crate in a storage space mostly adapted to the specific crate height. For example, the tallest crates can be stored on the storage surface L1, and the lowest crates can be stored on the storage surface L4 (if their height is smaller than the distance between the storage surface L4 and the top plate 101t of the storage array).

In various embodiments of the presently disclosed subject matter, each of the shelving units of a block (and which therefore share the same intersecting track array) comprises horizontally oriented storage surfaces uniformly spaced apart in the vertical direction. Two shelving units in a same shelving block may yet differ in the size of the vertical spacing. For example, the vertical spacing between horizontally oriented storage surfaces in one of the two shelving units may be 25%, 50%, 75% or any desired percentage of the vertical spacing between horizontally oriented storage surfaces in the facing shelving unit. The lift robots that serve both units of the shelving block may thus be routed by the computerized control system to store crates of a given range of sizes in a first of the facing shelving units, and to store crates of a different given range of sizes in the second of the facing shelving units. In some exemplary embodiments, the two shelving units which face each other, may define the routes that the lift robots may travel, as the locations where a track is available on both shelving units. In view of the non-uniform vertical distribution of tracks on both shelving units, the lift robots may travel on non-uniform grid of tracks, that has non-uniform vertical spacing, non-uniform horizontal spacing, or the like. In some exemplary embodiments, non-uniform horizontal spacing may be exhibited, even when the lift robot requires a predetermined horizontal spacing when traveling in vertical motion, such as based on non-uniform distribution of pairs of vertical tracks having the predetermined horizontal spacing therebetween.

Additionally or alternatively, the shelving block may comprise two mirroring shelving units, each of which having non-uniform vertical distribution of shelving and/or tracks.

In various embodiments of the presently disclosed subject matter, the vertical tracks Ta may extend upwardly beyond the top 101t of the shelving block. This extension of the tracks may allow the lift robots to approach with their grippers 193 closely under the top plate 101t, for handling crates that nearly fill up with their height the uppermost storage surface of the shelving block.

FIG. 1B illustrates a schematic front view of the lift robot 190 shown in FIG. 1A, with a crate 175 grasped between its loading-unit arms 192. Referring to FIG. 1D, there may be a desired region on the side walls of crate 176 within which the crate is to be gripped by the grippers 193 of the loading-unit arms 192. The desired region within which the crate is to be gripped may be between first and second predetermined heights h1 and h2 measurable from the bottom 176b of the crate. The dashed line HR represents the height of a horizontal track in which the rail wheels of the robot 190 are situated. A vertical distance between the rail height reference line HR may have a maximum S1 and a minimum S2 in case the loading-unit is capable of varying the position of the loading arms 192 in the vertical direction. In embodiments in which the loading arms are immovable in the vertical direction, S1 is equal to S2.

It can be appreciated that for picking a crate from a horizontal storage surface while griping the crate within said desired gripping region, the lift robot may be situated in the track array with its grippers 193 in front of the desired gripping region. The vertical distance between the storage surface on which the bottom 176b of the crate 176 rests, and between the grippers 193 need to be within the desired gripping range h2 minus h1. For this to be achieved, the lift robot may be situated in the track array such that a vertical distance d between the rail height reference line HR and the horizontal storage surface on which the bottom 176b of the crate rests is within the range h2+s2 and h1+s1. This range will be referred to also hereinafter "handling range".

It can be appreciated that for delivering a crate to a storage space, the vertical separation d between the rail height HR and the horizontal storage surface on which the crate is to be placed may be greater to some extent than the separation between them in case of retrieval of the same crate from the same storage surface. This is because when delivering a crate, it can be released from the grippers 193 when the bottom of the crate is a few centimeters from above the storage surface, leaving its delivery accomplished by gravity. The allowed distance may depend on the sensitivity of content of the crate to the shock that may result from the fall, and on other factors that may be considered by managers of the logistic center. This difference between delivery and retrieval may result with more flexibility in designing robot routes. For example, the control system of a logistic center may be programmed to allow 5 cm free fall for a group of crates containing specific goods. The control system may then instruct the robot to deliver a crate from the allowed group by approaching the intended storage space either through a horizontal track that its vertical separation from the intended storage surface allows for a delivery with no more than 5 cm drop, or through a vertical track, since vertical tracks allow the robot to accurately adapt its position from above the storage surface to any desired height. For retrieval of same crate, the control system may instruct the robot to approach the related storage space only through a vertical track, if the height HR of the horizontal track is beyond the handling range.

FIG. 1C illustrate a schematic profile view of a rail type 110 according to an exemplary embodiment that may be used for constructing track arrays according to various embodiments of the presently disclosed subject matter. The illustrated rail comprises (i) a backwall 110b (in various embodiments of the presently disclosed subject matter may be used for fixing the rail to external infrastructure, e.g. by means of screws; (ii) a travel ledge protruding perpendicularly from a first end of the backwall and divided into a road rail part 110w for a bearing wheel to travel along, and a rack part 110r to which a motor driven pinion is couplable for driving the robot along; and (iii) a cover ledge 110t protruding perpendicularly from a second end of the backwall opposite said first end, for the bearing wheel to travel along when the robot is in vertical motion mode.

FIG. 2A illustrates a schematic front view of a storage array 200 according to another exemplary embodiment of the presently disclosed subject matter. The storage array comprises a shelving unit 201 and a pair of intersecting track arrays. The track arrays comprise an array of vertically oriented tracks Ta, and an array of horizontally oriented tracks 205, 208, 209, 210. The vertically oriented tracks Ta divide the shelving block into a plurality of storage columns C1 to C6. The tracks Ta are spaced laterally with equal spaces in between, making the storage columns of a uniform width. In various embodiments of the presently disclosed subject matter, the top end of each of the vertical tracks Ta forms a junction with the uppermost horizontally oriented track 210, located substantially evenly with a top plate 201t of the shelving block.

In the schematic of the present disclosure, rails of horizontal tracks are represented by a framed dashed line. Edges of storage surfaces and of walls of the shelving unit are represented by a plain double line such as 204.

In some exemplary embodiments, the uppermost horizontal track 210 forms with the rightmost and the leftmost pairs of vertical tracks Ta, a loop-track closed with the lowermost horizontal track 205. In some exemplary embodiments, this loop of tracks allows a plurality of lift robots to encircle the shelving block in a predetermined direction, either clockwise or counterclockwise with minimal or no interference between their routes. Additionally or alternatively, the disclosed subject matter may be employed when the robots are not configured to move in a general circle movement throughout the rails. For example, in some embodiments, the robots may be configured to move freely on the tracks in any direction.

In the illustrated embodiment, the lowermost track 205 is located adjacently to the front edge of the second storage surface from the bottom of the array. There is no horizontal rail next to the front edge of the lowermost storage surface formed by a bottom plate 201b of the shelving block, since the lift robots have a vertical size (see distance S2 of robot 190 in FIG. 1D) greater than the height of the legs 203, thus may not fit into a track located only such a height above the floor. In various embodiments of the presently disclosed subject matter, lift robots are of a type having its loading unit from above (i.e. like an upside-down version of the robot 190, see FIG. 3). In such embodiments, the lift robot may fit into a horizontal track positioned close to the floor.

In various embodiments of the disclosed subject matter, lift robots having their loading-unit atop, cooperate with lift robots having suspended loading-unit in the delivery and retrieval of crates.

Some of the horizontal storage surfaces in the shelving array are spaced nonuniformly in the vertical direction. The storage spaces in the shelving structure 201 are therefore of varied heights. The most common volume spaces are of the size D, e.g. the topmost storage space in column C1, which can store crates sized up to the size of crate 272. Other storage spaces can be of any desired size up to the full height between the bottom and top plates 201b and 201t of the shelving unit. Crate sizes may be limited not only by the dimensions of the storage spaces but also on the limitation of the robots in terms of dimensions and of weights that can be handled.

In the illustrated embodiment, the shortest height storage space is hosts crate 271. The tallest storage space is the one marked A, which stores crate 273. The storage space sized A is as twice high as the storage spaces sized D. The storage space sized C as of half the height of D. The second storage space from the bottom of column C3 sized B is of a slightly greater height than the height of D.

Regardless of the height of the storage space, all storage spaces are accessible to the lift robots through vertical motion along the vertical tracks. However, if the robot 190 is to be used, the storage spaces on the topmost row of the shelving array may not be as small as the storage space that hosts the crate 271 (or even bigger), due to the limitation mentioned above with reference to FIG. 1D. In case short height crates are to be stored in the topmost row of a shelving unit, an embodiment such as illustrate in FIGS. 1A and 2B, with vertical upwardly protruding track rails, may be used. In the embodiment of FIG. 2A, horizontal tracks 205 209 and 210, which intersect with the rightmost vertical rail (to the right of column C6) comprise respective extensions 205e 209e and 210e, which protrude beyond the right wall 201R of the shelving block. Depending on the intended use of the extensions and on the surroundings of the shelving block, the horizontal tracks may or may not extend also to protrude beyond the left wall 201L of the shelving block.

FIG. 2B illustrate a schematic front view of a storage array according to additional exemplary embodiment of the presently disclosed subject matter. The embodiment of FIG. 2B differs from that of FIG. 1A in the division of the storage spaces, in the arrangement of the vertical and of the horizontal track arrays, and consequently in the maneuvering taken by the lift robots for accessing the variety of storage spaces provided. The embodiment assumes the grippers of the lift robot are capable of coming closer in the lateral direction, for handling crates having a width in the range between 40% and 100% the width of the crates (e.g. 278) presented in FIG. 2A.

The shelving unit 221 comprises six columns C1 to C6. In some exemplary embodiments, only a portion of the columns (e.g., C1 and C6 in the present illustrated embodiment) are provided with pairs of vertical tracks which allow for accessibility to all storage spaces through vertical motion. Column C2 is provided with vertical track 242 which together with the neighboring track 241 provides for accessibility to its storage spaces by vertical motion mode only for the first three storage spaces from the bottom plate 221b. For accessing the crate 280 hosted in the fourth storage space, the lift robot may be required to align with column C2 trough the horizontal track 230 (for meeting the limitations associated with the description of FIG. 1D).

Figure 2C:
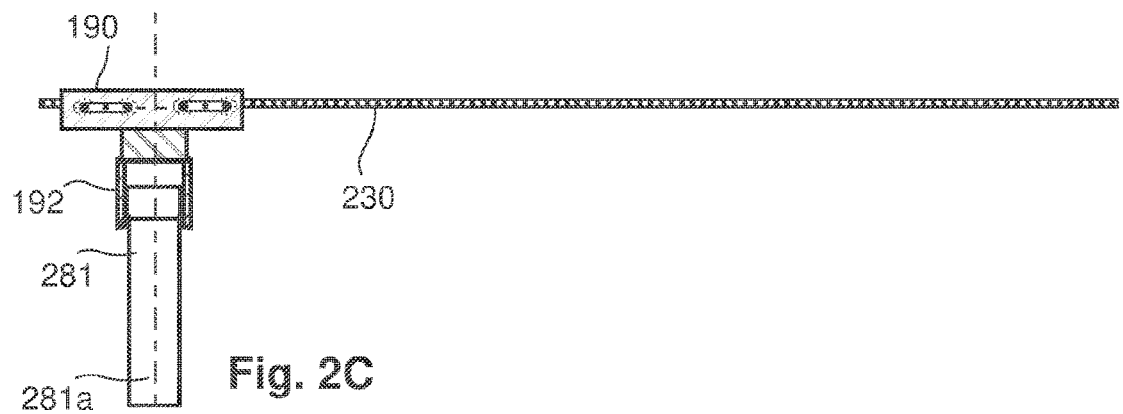
FIG. 2C illustrates selected parts from the shelving unit illustrated by FIG. 2B, with a lift-robot in position for handling a crate.

The horizontal track 230 is extended to the left and protrude beyond the left wall 221L of the shelving block, to an extent annotated 230L. The extension 230L allows the lift robot 190 to align symmetrically in front of crate 281 (see in FIG. 2C projection of rail 230 and crate 281, with the axis of symmetry 281*a* of the crate in alignment with the axis of symmetry of the robot) and access it by bringing its grippers together in the lateral direction to about the width of crate 281, then moving them forward for gripping and pulling the crate from the storage space. Reversing said operation in time provides for delivery of the crate into the storage space. As can be appreciated, another crate of similar width can be stored to the right of crate 281. Crates of shorter height may be handled to and from the same storage space by situating the robot through the horizontal track 229.

Shorter crates, such as 282, may be stored in the storage spaces between tracks 229 and 230, and are accessible to robots situated in the horizontal track 231 next to the top plate 221*t* of the shelving unit. Crate 282 may be accessed also through vertical motion mode using the pair of vertical tracks 240 and 241, by robot models having the capability of shifting the grippers off the axis of symmetry of the robot.

The storage space between horizontal tracks 230 and 231 may be accessible to lift robot models having the loading-unit from above the locomotion part, by traveling through horizontal track 229.

In various embodiments of the disclosed subject matter, lift robots having their loading-unit atop, cooperate with lift robots having suspended loading-unit in the delivery and retrieval of crates.

For example, lift robot having a loading-unit atop may retrieve a crate stored in the storage space between horizontal tracks 230 and 231 (i.e. by traveling laterally through track 229 to align with and pick the intended crate), then switch direction in an intersection between track 229 and either of the vertical pair of tracks, e.g. 241-242, and descend to some mid portion thereof. Another lift robot having a suspended loading-unit may then approach from above and pick the crate in an analogous manner as picking a crate from a floor robot. The lift robot with the suspended loading unit can then perform with the crate as it regularly performs with picked crates, while the lift robot having the loading-unit atop, may continue to either accept a crate from another robot for delivering it to the storage space between the horizontal tracks 230 and 231, or to retrieve another crate from this storage space and repeat the above described exchange with a lift robot having suspended loading-unit.

Crates 279 of a mid-width between that of 282 and that of 280 are stored in the storage space between horizontal tracks 228 and 229. They may be handled by robots situated in an adjacent horizontal track, such as 230, 229, 228, 227, or the like.

Likewise, storage space between horizontal tracks 226 and 227 may be accessible through adjacent horizontal track, such as 228.

All the storage spaces between bottom plate 221*b* and horizontal track segment 226, are accessible (depending on their height, which is known to the system controller which route the robots accordingly) to robots situated in either horizontal track segment 226, or in horizontal track 227. The horizontal track 226 is a portion of horizontal track 225 which extend about storage spaces inaccessible through vertical motion modes due to lack of vertical tracks.

Storage spaces in columns C1 and C6, as well as in the lower portion of column C2 are accessible to robots situated in the relevant vertical tracks pair, from pairs 240-241, 241-242, and 243-244.

The track pairs 240-241 and 243-244 extend upwardly beyond the top plate 221*t*, thereby providing for handling short height crates located in columns C1 and C6 on a storage surface next to horizontal track 230.

Track extensions such as 231*e* and 225*e* may be provided and protrude laterally beyond the right vertical wall 221R to any desired extent, e.g. for robot maneuvering when switching motion mode from horizontal to vertical, or e.g. for allowing robots to align with narrow crates stored to the left of side wall 221R.

The vertical tracks 240, 241, 242, 243 and 244, intersect with the lower horizontal track 225. In various embodiments of the presently disclosed subject matter, the vertical tracks are extended to a predetermined extent below the lowest horizontal track, this may allow robots to handle crates of shorter height, allow maneuvering e.g. for exchanging crates with floor robots, and for any other desired purposes. In various embodiments of the presently disclosed subject matter, the bottom ends of a vertical track do not extend beyond the bottom of the lowest track with which they intersect.

The uppermost horizontal track 231 forms with the right and the left pairs of vertical tracks 240-241 and 243-244, a loop-track closed with the lowermost horizontal track 225. This loop of tracks may allow a plurality of lift robots to encircle the shelving block in a predetermined direction, either clockwise or counterclockwise with minimal or no interference between their routes. However, in other embodiments, the robots may move freely in any desired direction across the tracks and not be limited to a general encircling motion.

Figure 3:
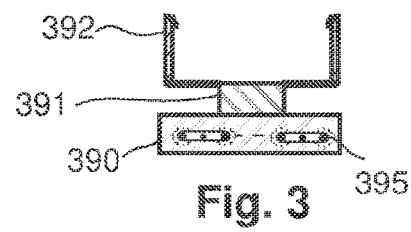
FIG. 3 illustrates a schematic front view of a lift robot having its loading-unit atop for handling short height crates from upper shelves.

FIG. 3 illustrates a schematic front view of a lift robot 390 having its loading-unit 391 atop for handling short height crates from upper shelves. When its wheels 395 are situated in a track below the location of the storage space to be approached, it can slide its loading unit arms 392 toward the storage space for delivering or retrieving a crate. Therefore, while lift robots 190 with suspended loading-unit may be incapable of approaching a location due to lacking of tracks within the desired distance (as mentioned above with reference to FIG. 1D) from above the location, the intended task may be performed by a robot such as 390 approaching the location through track/s located applicably underneath the location.

With the dense size-depended arrangement of crates within the storage array based on the arrangements and procedures described herein, the logistic center may become highly space-efficient. Moreover, with crates stored denser, the average traveling distance per a delivery/retrieval task decreases, resulting with saving in energy and maintenance costs. In various embodiments of the presently disclosed subject matter, the computerized control system may be configured to improve the space efficiency by automatic relocation of crates. The improvement may be achieved by relocating crates of a given size range from a shelving unit having a given uniform vertical spacing unnecessary large for the related crates, to a facing shelving unit having a given smaller uniform vertical spacing when the latter become available. In embodiments of the disclosed subject matter in which one shelving unit has regions differing in the vertical spacing, the improvement may be achieved by relocating a given size range from a region of a given vertical spacing to a region of a smaller vertical spacing in the same shelving unit, thereby optimizing the storage space-efficiency furthermore.

The flowchart and block diagrams in the Figures illustrate the architecture, functionality, and operation of possible implementations of systems, methods and computer program products according to various embodiments of the present disclosed subject matter. It should also be noted that, in some alternative implementations, the functions noted in the block may occur out of the order noted in the figures. For example, two blocks shown in succession may, in fact, be executed substantially concurrently, or the blocks may sometimes be performed in the reverse order, depending upon the functionality involved.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A storage setup for logistic centers using lift robots for storing and retrieving crates, the storage setup comprises:
   at least one shelving block comprising at least one shelving unit, each shelving unit having a plurality of horizontally oriented vertically spaced apart storage surfaces configured to store thereon crates;
   a network of intersecting track arrays deployed next to the block's shelving for allowing robotic delivery and retrieval of crates to and from storage locations in the shelving block, wherein the network of intersecting track arrays comprises an array of horizontal tracks comprising a plurality of horizontally oriented track segments non-uniformly spaced apart in the vertical direction; and
   a computerized control system in which storage locations and track data are registered such that robots can be routed by the computerized control system through the tracks for delivering crates to and retrieving crates from the storage locations;
   wherein at least two groups of storage locations in the shelving block differ in the size of the vertical spacing between horizontally oriented storage surfaces such that crates of a height shorter than the size of the vertical spacing in at least one of the groups but taller than the size of the vertical spacing in other of the groups can be robotically stored to and retrieved from a horizontally oriented storage surface constituting a storage location in which the vertical spacing is of a size greater than a height of the crate;
   wherein the computerized control system is configured to differentiate between storage locations based on which crate sizes from at least two different ranges of crate sizes a storage location is capable of storing.

2. The storage setup for logistic centers according to claim 1, wherein at least one pair of vertically oriented tracks is positioned next to the shelving unit in front of at least one of the groups of storage locations which differ in size of the vertical spacing between horizontally oriented storage surfaces.

3. The storage setup for logistic centers according to claim 1, wherein the array of vertically oriented tracks comprises uniformly spaced apart vertical tracks installed next to the shelving unit all along the lateral extent of the shelving block.

4. The storage setup for logistic centers according to claim 1, wherein at least a predetermined number of tracks from the array of horizontal tracks are positioned next to front edges of horizontally oriented storage surfaces included in the regions which differ in spacing in the vertical direction between horizontally oriented storage surfaces.

5. The storage setup for logistic centers according to claim 1, wherein at least some of the tracks segments which are non-uniformly spaced apart in the vertical direction, are deployed substantially next to front edges of respective horizontally oriented storage surfaces.

6. The storage setup for logistic centers according to claim 1, wherein free ends of vertical rails included in the array of vertically oriented tracks extend a predetermined extent from above a topmost horizontally oriented storage surface.

7. The storage setup for logistic centers according to claim 1, wherein free ends of horizontal rails included in the array of horizontally oriented tracks extend a predetermined extent beyond a lateral end of the shelving block.

8. The storage setup for logistic centers according to claim 1, wherein at least a lowermost horizontal track extends evenly all along the lateral extent of the shelving block.

9. The storage setup for logistic centers according to claim 1, wherein a topmost and a lowermost horizontal tracks intersect with a pair of leftmost vertical tracks and with a pair of rightmost vertical tracks, thereby forming a closed-loop track arrangement through which a plurality of between two and a predetermined maximal number of robots can co-move either clockwise or counter clockwise such that none of the co-moving robots disturbs the motion of another.

10. The storage setup for logistic centers according to claim 1, wherein at least in regions of the shelving block where a vertical spacing between neighboring horizontal storage surfaces exceeds a predetermined threshold value, the shelving block comprises a plurality of uniformly spaced apart vertical tracks installed next to front edges of the horizontal storage surfaces constituting said regions.

11. The storage setup for logistic centers according to claim 1, wherein the computerized control system is further configured to route robots to store crates in storage locations based on detecting the correlation between the range of crate sizes to which each crate is related and between the vertical spacing associated with an intended storage location.

12. The storage setup for logistic centers according to claim 11, wherein the computerized control system is configured to route robots to store crates in storage locations sized in correlation with the size of the crate to be stored, wherein crates intended for storage are routed for storage in a smallest available storage location capable of storing an intended crate.

13. The storage setup for logistic centers according to claim 12, wherein the computerized control system is configured to route robots for relocating crates from storage locations of a first height to storage locations having a height smaller from the first and larger than a height of a relocation intended crate, whenever criteria are met.

14. The storage setup for logistic centers according to claim 13, wherein the criteria include a storage location of a height smaller than the first and larger than a height of a relocation intended crate becomes available.

15. The storage setup for logistic centers according to claim 13, wherein the criteria include there is a shortage in storage locations of a height similar to a height of a storage location where a crate that can be stored in a storage location of a smaller height can be stored.

16. A storage setup for logistic centers using lift robots for storing and retrieving crates, the storage setup comprises:
  at least one shelving block comprising at least one shelving unit, each shelving unit having a plurality of horizontally oriented vertically spaced apart storage surfaces configured to store thereon crates, wherein a predetermined number of horizontal surfaces located in a first region of the at least one shelving block are vertically spaced apart each from a neighboring surface a distance between 10% and 90% smaller than a distance between horizontal neighboring surfaces of another predetermined number of surfaces located at a different region of the at least one shelving block;
  a network of intersecting track arrays deployed next to the block's shelving for allowing robotic delivery and retreival of crates to and from storage locations in the shelving block; and
  a computerized control system in which stoage locations and track data are registered such that robots can be routed by the computerized control system through the tracks for delivering crates to and retrieving crates from the storage locations;
  wherein at least two groups of storage locations in the shelving block differ in the size of the vertical spacing between horizontally oriented storage surfaces such that crates of a height shorter than the size of the vertical spacing in other of the groups can be robotically stored to and retrieved from a horizontally oriented storage surface constituting a storage location in which the vertical spacing is of a size greater than a height of the crate;
  wherein the computerized control system is configured to differentiate between storage locations based on which crate sizes from at least two different ranges of crate sizes a storage location is capable of storage.

17. A storage setup for logistic centers using lift robots for storing and retrieving crates, the storage setup comprises:
  at least one shelving block comprising at least one shelving unit, each shelving unit having a plurality of horizontally oriented vertically spaced apart storage surfaces configured to store theron crates;
  a network of intersecting track arrays deployed next to the block's shelving for allowing robotic delivery and retrieving of crates to and from storage locations in the shelving blocks; and
  a computerized control system in which storage locations and track data are registered such that robots can be routed by the computerized control system through the tracks for delivering crates to and retrieving crates from the storage locations;
  wherein at least two groups of storage locations in the shelving block differ in the size of the vertical spacing between horizontally oriented storage surface such that crates of a height shorter than the size of the vertical spacing in at least one of the groups but taller than the size of the vertical spacing in other of the groups can be robotically stored to and retrieved from a horizontally oriented storage surface constituting a storage location in which the vertical spacing is of a size greater than a height of the crate;
  wherein the computerized control system is configured to differntiate between storage locations based on which crate sizes from at least two different ranges of crates sizes a storage location is capable of storing;
  wherein at least in regions of the shelving block where a vertical spacing between neighboring horizontal storage surfaces exceeds a predetermined threshold value, the shelving block comprises a plurality of uniformly spaced apart vertical tracks installed next to front edges of the horizontal storage surfaces constituting said regions, wherein the predetermined threshold value is equal to the sum of (i) a height between a bottom of a maximal height crate to be stored in the shelving block and a topmost portion of such crate where grasping arms of a lift-robot loading-unit can take a grasp and load the crate; and (ii) a maximal vertical separation between a hypothetic horizontal track and the grasping arms of said lift-robot loading-unit, when the lift robot is situated in the hypothetic horizontal track.

18. A computerized control system for robotic delivery and retrieval of crates in a logistic center setup, wherein the system is configured to register storage locations and track data and to route robots through tracks for delivering crates to and retrieving crates from the storage locations, wherein the registration of storage locations includes differentiation between at least two groups of storage locations differing in the vertical distance between horizontally oriented storage surfaces in each group; wherein the logistic center setup is configured to utilize lift robots for storing and retrieving crates in and from at least one shelving block comprising at least one shelving unit, whereon each of the at least on shelving unit has a plurality of horizontally oriented vertically spaced apart storing surfaces configured to store thereon crates; and wherein a network of intersecting track arrays is deployed next to the shelving block for allowing robotic delivery and retrieval of crates to and from storage locations in the shelving block, wherein the network of intersecting track arrays comprises an array of horizontal tracks comprising a plurality of horizontally oriented track segments non-uniformly spaced apart in the vertical direction.

19. The computerized control system for robotic delivery and retrieval of crates in a logistic center according to claim 18, wherein the system is further configured to relocate crates for storage optimization.

20. The computerized control system for robotic delivery and retrieval of crates in a logistic center according to claim 18, wherein the system is further configured to route lift robots having loading-unit atop and lift robots having suspended loading unit to a meeting point on the track network for exchanging a crate.

21. A method for robotic delivery and retrieval of crates to and from non-uniformly sized storage spaces in a shelving array wherein the storage spaces are accessible to lift robots through intersecting arrays of vertically oriented and horizontally oriented tracks, the method comprises:

having a minimum and a maximum of a vertical extent between a horizontal track and loading-unit grippers of a lift-robot configured to be situated in the horizontal track;

having a minimum and a maximum height between a bottom of a crate to be handled by the lift robot and a desired gripping region within which the crate walls are to be contacted by said grippers when grasping the crate;

determining a location on a horizontal storage surface in a shelving unit, to which the crate is to be delivered or from which retrieved by the lift robot;

calculating a desired range of heights with respect to the horizontal surface at which the lift-robot is configured to be situated when handling the crate to or from the location;

determining the availability of horizontal tracks and of vertical tracks in which the lift robot is configured to be situated for aligning its grippers in front of the location within said range of heights;

selecting a specific lift robot for handling the crate to or from the location;

routing the lift robot through said arrays of intersecting tracks to within the desired range of heights with respect to the location and situating the lift robot in alignment with the location; and activating said arms for handling the crate to or from the location.

22. The method for robotic delivery and retrieval of crates according to claim 21, wherein the desired range of heights for delivering a crate to the location differs from the desired range of heights for retrieving the same crate from the location.

23. The method for robotic delivery and retrieval of crates according to claim 21, further comprising the step of determining what type robot is suitable for the delivery or retrieval of the crate; and performing the method with respect to at least two suitable robot types before the step of selecting a specific robot for the delivery or retrieval of the crate.

* * * * *